Patented Feb. 25, 1936

2,031,909

UNITED STATES PATENT OFFICE 2,031,909

SOLDERING FLUX

William K. Schweitzer, East Cleveland, Ohio, assignor to The Grasselli Chemical Company, Cleveland, Ohio, a corporation of Delaware No Drawing. Application October 31, 1933, Serial No. 696,118

9 Claims. (Cl. 148—26)

This invention is directed to a flux and the process of using it in the soft soldering of metals, such as tin plate, galvanized iron, copper, brass, etc.

I have found that phosphates which decompose at or below the temperatures used in soft soldering constitute excellent fluxes. The temperatures encountered in commercial soft soldering will usually range between about 400° F. and about 650° F. Whatever the temperature range employed a suitable phosphate flux may be selected, it being only necessary that the phosphate selected decompose at or below the temperature at which the soldering takes place. It is not necessary that the phosphates decompose far below soldering temperatures. It is only necessary that the thermal decomposition take place prior to, or during the soldering operation at the temperatures required for the soldering operation.

Among the organic and inorganic thermally decomposable phosphates which I have found suitable I may mention, for example, diammonium phosphate, disodium phosphate, amine phosphates, glyceryl phosphates, butyl phosphates, etc. I may also use mixed phosphate salts, such as microcosmic salt, which are thermally decomposable at or below soldering temperatures.

The soldering operation takes place, of course, in the presence of the decomposition products of the phosphate selected. There may also be present some undecomposed phosphates and some partially decomposed phosphates. As the operation continues the decomposition proceeds until, usually, the phosphates are entirely decomposed. Microcosmic salt, for example, on heating decomposes to form sodium metaphosphate. I may, accordingly, use sodium metaphosphate and similar decomposition products as fluxes, although I prefer to use, as heretofore stated, the thermally decomposable phosphates.

My new fluxes may be used in the usual manners, in dry form, as a paste, or in solution.

For example, I may make a saturated solution of diammonium phosphate in water and apply it in one of the usual ways to the metal to be soldered. After applying the flux the soldering operation proceeds as usual.

I claim:

1. In a process of soft soldering the step of applying a flux comprising a major amount of a phosphate thermally decomposable at or below soft soldering temperatures.

2. In a process of soft soldering the step of applying solder in the presence of the decomposition product of a phosphate thermally decomposable at or below soft soldering temperatures.

3. In a process of soft soldering the step of applying a flux comprising a major amount of diammonium phosphate.

4. In a process of soft soldering the step of applying a flux comprising a major amount of microcosmic salt.

5. In a process of soft soldering the step of applying solder in the presence of a phosphate which is the thermal decomposition product of a flux composition comprised principally of a phosphate thermally decomposable at or below soft soldering temperatures.

6. In a process of soft soldering the step comprising applying a flux consisting of a phosphate thermally decomposable at or below soft soldering temperatures.

7. In a process of soft soldering the step comprising applying a flux consisting substantially of a phosphate thermally decomposable at or below soft soldering temperatures.

8. In a process of soft soldering the step comprising applying a flux consisting substantially of diammonium phosphate.

9. In a process of soft soldering the step comprising applying a flux consisting substantially of a microcosmic salt.

WILLIAM K. SCHWEITZER.